June 27, 1961 W. WAHLI ET AL 2,990,085
MATERIAL HANDLING APPARATUS
Filed Oct. 22, 1959 3 Sheets—Sheet 3

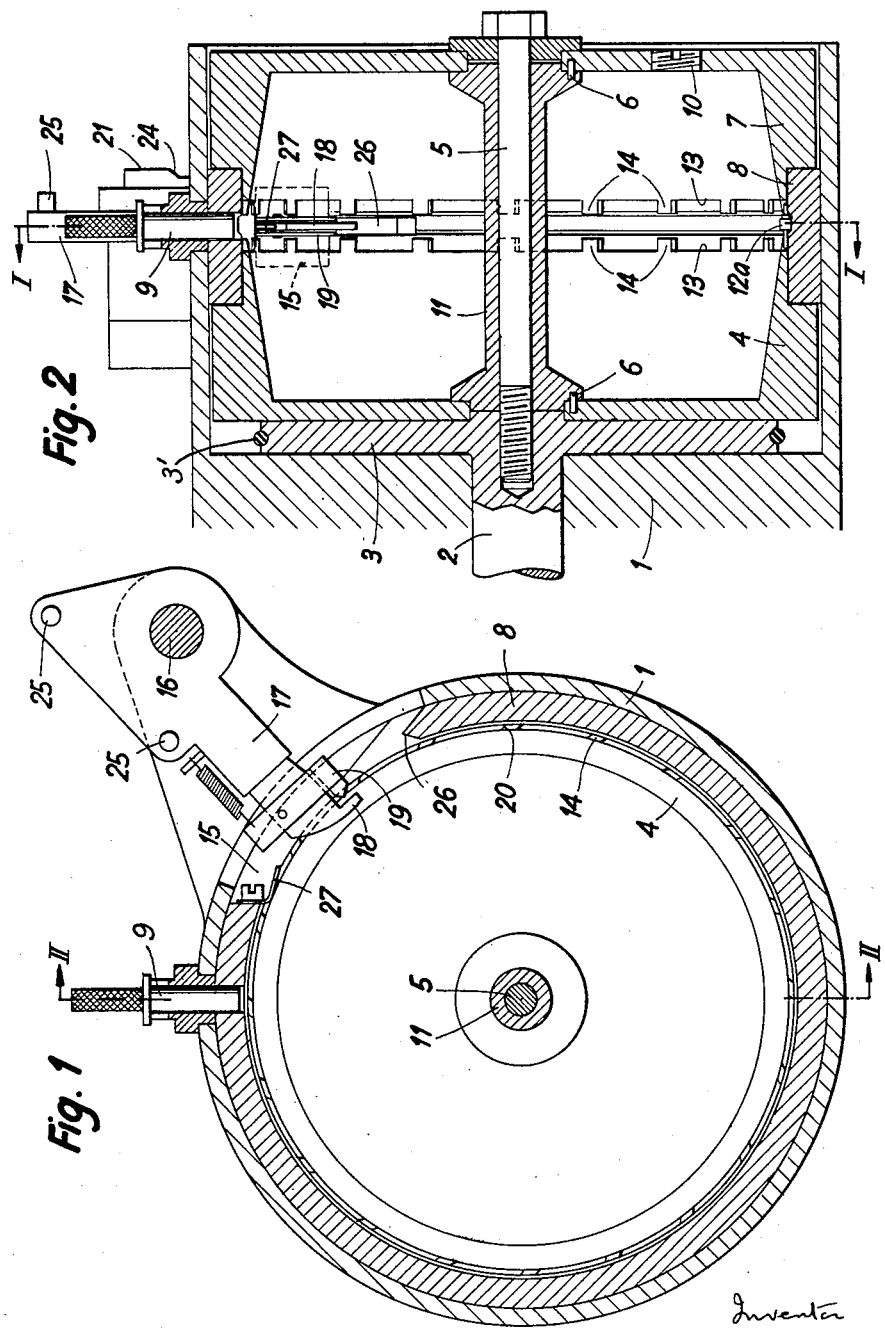

Inventors
Werner Wahli
Marcel Moser
BY
Michael S. Striker
Attorney

United States Patent Office 2,990,085
Patented June 27, 1961

2,990,085
MATERIAL HANDLING APPARATUS
Werner Wahli and Marcel Moser, Bevilard, Switzerland, assignors to Wahli Freres, Bevilard, Switzerland
Filed Oct. 22, 1959, Ser. No. 847,949
5 Claims. (Cl. 221—167)

The present invention relates to material handling apparatus.

More particularly, the present invention relates to material handling apparatus adapted to be used with machine tools or the like for handling workpieces of relatively small size, for example, so as to transport these workpieces from a container to a position where the workpieces can be further handled.

One of the objects of the present invention is to provide a material handling apparatus which will automatically orient the workpieces properly so that they will be in the proper attitude to be handled by the apparatus as well as to be further handled by apparatus to which they are delivered.

Another object of the present invention is to provide a structure capable of very rapidly handling a large number of workpieces in a fully automatic manner so as to deliver the workpieces in properly oriented position to a given location.

It is a further object of the present invention to provide a structure which has components which will operate automatically in a predetermined sequence as a result of the moving of various parts one with respect to the other.

It is also an object of the present invention to provide an exceedingly simple and yet rugged apparatus which will operate reliably over a long period of time.

With the above objects in view, the present invention includes in a material handling apparatus, a stationary ring and a coaxial rotary ring located beside the stationary ring, having a common horizontal axis therewith, and forming with the stationary ring at least part of a container for a plurality of the workpieces which are to be handled. This stationary ring has an inner surface provided with a profile mating with that of the workpieces so that the latter will be automatically oriented on the inner surface of the stationary ring, and this stationary ring is formed at a portion which is located substantially higher than its lowest part with a discharge opening for the workpieces. The rotary ring has a projection overlapping the inner surface of the stationary ring and thus engaging a workpiece on the inner surface of the stationary ring to move this workpiece along the inner surface of the stationary ring up to the discharge opening.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a transverse sectional elevation of a material handling apparatus according to the invention, FIG. 1 being taken along line I—I of FIG. 2 in the direction of the arrows;

FIG. 2 is an axial section of the apparatus of FIG. 1 taken along line II—II of FIG. 1 in the direction of the arrows;

Figure 3:
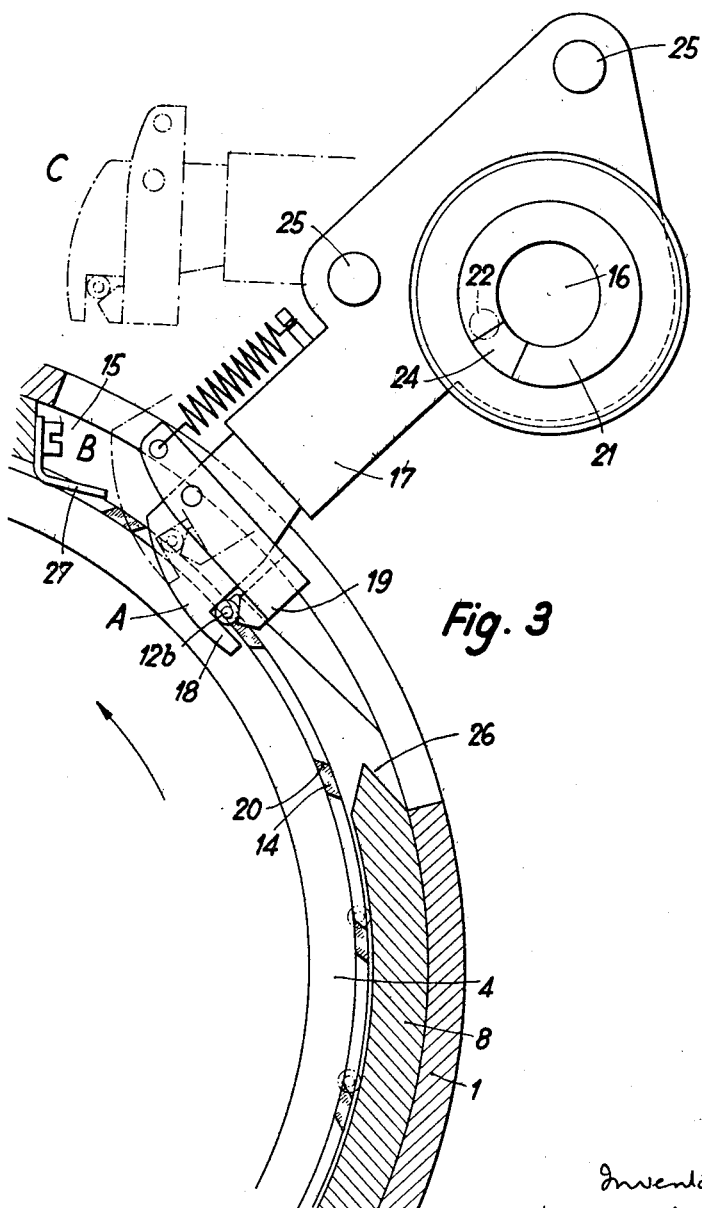
FIG. 3 is a reproduction of part of the structure of FIG. 1 on a considerably enlarged scale.

Referring now to the drawings and to FIGS. 1 and 2 in particular, the apparatus of the invention includes a housing 1 which may, for example, be mounted by means of an unillustrated traverse carriage on the housing of an automatic machine tool such as a machine for forming teeth on the pinions of watches. The housing 1 includes a bearing which supports a shaft 2 (FIG. 2) for rotation about its axis, and this shaft 2 is fixed with a pulley 3 which is driven over a suitable belt 3' by any suitable motor. The pulley 3 and the shaft 2 have a horizontal axis. A rotary ring 4 is located next to the pulley 3 and is fixed to the latter in a manner described below for rotatoin therewith. A spacer 11 in the form of an elongated tube is fixed coaxially to the rotary ring 4 by a pin 6, and this spacer 11 is fixed by a second pin 6 to a second rotary ring 7 which may be identical with the rotary ring 4. These rings 4 and 7 are axially spaced from each other and are provided at their exterior surfaces adjacent their ends which are next to each other with annular shoulders forming an annular space in which a stationary ring 8 is located. The housing 1 carries a stationary pin 9 extending downwardly into an opening of the stationary ring 8 at the upper part of the latter, as is evident from FIG. 2, so that the ring 8 cannot turn, and the stationary ring 8 together with the pair of rotary rings 4 and 7 cooperate together to form a drum-like container for the workpieces which are to be handled by the apparatus of the invention. A plurality of these workpieces all of which are of the same construction are inserted into the container 4, 7, 8 through an opening in the right wall of the ring 7, as viewed in FIG. 2, this opening being thereafter closed by a threaded plug 10. A screw 5 extends through the axial bore of the spacer 11 into threaded engagement with the shaft 2 so as to press the ring 7 against the right end of the spacer 11, as viewed in FIG. 2, as well as to act through the spacer 11 on the left wall of the ring 4, as viewed in FIG. 2, so as to hold the assembly of rings 4, 7, 8 together as well as to fix the ring 4 to the pulley 3 for rotation with the latter.

Figure 4:
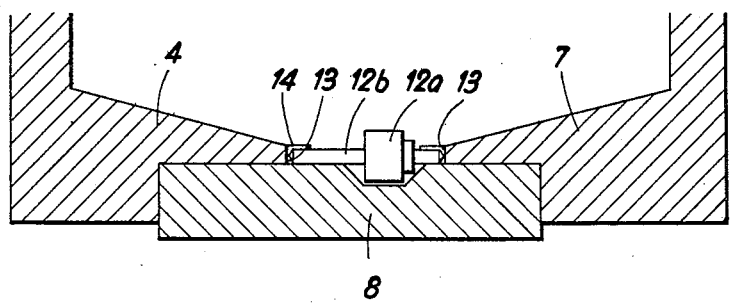
FIG. 4 is a reproduction of part of the structure of FIG. 2 also on a considerably enlarged scale.

The stationary ring 8 has an inner annular surface portion located between the rings 4 and 7, and this surface portion is provided with a profile mating with that of the workpieces. Thus, as is shown most clearly in FIG. 4, where the workpieces have intermediate cylindrical portions 12a of a diameter somewhat larger than the coaxial end portions 12b thereof, the inner surface of the ring 8 is provided with the profile shown in FIG. 4 so that the coaxial portions 12b can ride along the surface of the ring 8 on opposite sides of the groove of the latter which receives the portion 12a of larger diameter. It will be noted from FIG. 4 that even though the workpieces are not symmetrical they will nevertheless necessarily become properly oriented with respect to the profile of the inner surface of the ring 8. As is apparent from FIG. 2, the rings 4 and 7 cooperate with the ring 8 to provide a pile of the workpieces in the lower portion of the container formed by the rings 4, 7 and 8, and the workpieces at the bottom of the pile keep moving around due to the rotation of the rings 4 and 7 until they become properly oriented and then simply fall by gravity to the position indicated in FIG. 4 where they are properly oriented with respect to the ring 8.

As is shown most clearly in FIG. 2, the inner peripheral portions of the rings 4 and 7 which overlap the inner surface of the ring 8 are formed with a series of notches 13 which are separated from each other by projections 14, and these projections 14 are aligned, as is evident from FIG. 2, so that each pair of aligned projections will engage the portions 12b of the workpiece to move the latter upwardly along the inner surface of the stationary ring 8 during rotation of the rotary rings 4 and 7. The stationary ring 8 is formed at an elevation substantially higher than its lowest part with a discharge opening 15, the outline of which is indicated in FIG. 2, so that the turning rotary rings 4 and 7 will with their projections 14 engage the workpieces successively and raise them one after the other along the inner surface of the ring 8 up to the discharge opening 15 thereof.

The housing 1 is provided beyond the container formed by the rings 4, 7 and 8 with a bearing for a second shaft 16 which is parallel to the shaft 2, and this shaft 16 (FIGS. 1 and 3) is free to turn around its axis but cannot move along its axis. This shaft 16 forms the support for a turnable receiving means 17 which receives a workpiece from a pair of aligned projections 14. Thus, the member 17 is fixed to the shaft 16 to turn with the latter and includes a stationary jaw 18 and a movable jaw 19 pivoted on the stationary jaw 18 and urged by the spring shown in FIGS. 1 and 3 to turn in a clockwise direction, as viewed in FIGS. 1 and 3. In the initial position A indicated in FIG. 3 the receiving means 17 has its jaws 18 and 19 positioned in the path of turning of the workpiece so that when the latter has almost reached the bottom edge 15a of the discharge opening 15 it will enter into the space between the jaws 18 and 19 and will be held by these jaws in the manner indicated in FIG. 3. Now the continued turning of the rings 4 and 7 in a counterclockwise direction, as indicated by the arrow in FIG. 3, will continue to advance the workpiece in a counterclockwise direction also, and through the workpiece the pair of aligned projections 14 which engage the workpiece will act on the receiving means 17 to turn the latter in a clockwise direction about the axis of the shaft 16 up to the position B indicated fragmentarily in dot-dash lines in FIG. 3. It will be noted that at the position B the workpiece has been moved to a location which is no longer located in the path of turning of the projections 14. Thus, at this time the workpiece will move with the receiving means 17 along a circular path whose center is in the axis of the shaft 16, and the surfaces 20 of the projections 14 which engage the workpiece will simply move beyond the workpiece when the latter has located the receiving means 17 in position B.

Figure 5:
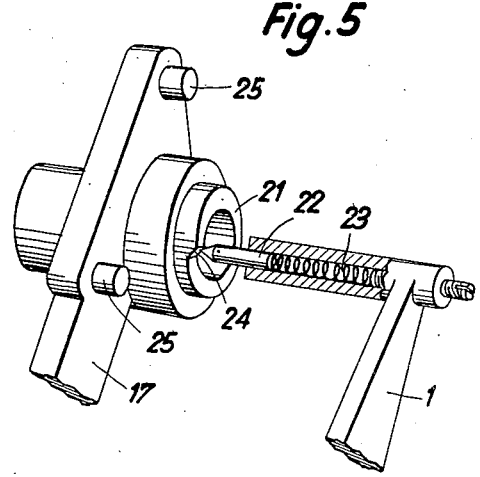
FIG. 5 is a partly sectional perspective fragmentary illustration of a structure which operates automatically to move the means which receives the workpieces from a container therefor.

A means is provided for automatically continuing the movement of the receiving means 17 beyond the position B indicated in FIG. 3, when the receiving means has reached this position. The hub of the receiving means 17, which surrounds and is fixed to the shaft 16, is provided with a helical annular surface 21 of relatively small inclination, and the ends of the helical surface 21 are joined by a relatively short surface portion 24 of sharp inclination. Referring to FIG. 5, it will be seen that the housing 1 has a portion provided with a bore in which a plunger 22 is axially slidable, this plunger 22 being acted upon by a spring 23 so that the free end of the plunger 22 engages the helical surface 21. When the rotary rings through their projections 14 move the workpiece together with the receiving means 17 to the position B, this movement takes place in opposition to the braking force provided by the pressing of the plunger 22 against the helical surface 21. The parts are so designed that when the receiving means 17 reaches the position B the end of the plunger 22 will have just moved on to the sharply inclined surface 24, as indicated in FIG. 5, and now the receiving means is subjected to the force of the spring 23 which acts through the plunger 22 on the surface 24 to turn the receiving means 17 from the position B indicated in FIG. 3 to the position C indicated in dot-dash lines in FIG. 3. The receiving means 17 carries pins 25 which actuate electrical contacts so as to set into motion the structure for controlling the further movement of the receiving means 17, as desired.

The operation is started when the machine tool is ready to receive a workpiece and when the motor which drives the shaft 2 is turned on. The receiving means 17 is brought back to the initial position A through a suitable unillustrated drive structure which operates on the shaft 16, and the wall of the stationary ring 8 is formed with a slot 26 located in a plane normal to the axis of the ring 8 and this slot 26 extends downwardly from the lower edge 15a of the discharge opening 15, as is evident from FIG. 3. The relatively thin slot 26 is wide enough to accommodate the jaws 18 and 19 which turn through the slot 26 to the starting position illustrated in FIG. 3.

In the illustrated example, as is particularly evident from FIG. 3, the projections 14 are provided with surfaces 20 inclined rearwardly with respect to the direction of rotation of the rotary rings 4 and 7, and this inclination of the surfaces 20 is required only in the illustrated situation where the discharge opening 15 is above the axis of the stationary ring 8. If discharge opening 15 is located below the axis of the stationary ring 8 it is unnecessary to provide the projections 14 with inclined surfaces 20.

As apparent particularly from FIG. 2, the inner annular surfaces of the rings 4 and 7 are frusto-conical and are inclined in the manner indicated in FIG. 2 so that these inner surfaces of the rotary rings 4 and 7 will serve to form a pile of the workpieces at the bottom of the interior space defined by the rings 4, 7 and 8. As a result of this formation of the pile of workpieces the likelihood of each successive pair of aligned projections 14 engaging a workpiece which is properly oriented with respect to the inner surface of the stationary ring 8 is greatly increased. If any workpieces should move along the discharge opening 15 without being engaged by the receiving means 17, then a springy member 27 which is fixed to the upper edge 15c of the opening 15 will engage such workpieces and will cause them to drop from the projections 14.

If desired, the container formed by the rings 4, 7 and 8 may be partly filled with oil or another fluid.

Also, if desired, the entire receiving means 17 may be omitted, and in this case the projections 14 will raise the workpieces up to the lower edge 15a of the discharge opening 15, and then from this lower edge 15a the workpieces will roll onto the downwardly inclined surface 15b located at the exterior of the stationary ring 8. Any suitable inclined or vertical magazine chutes may communicate with the inclined surface 15b to receive the workpieces therefrom, in this case. Of course, the housing 1 is formed with an opening, aligned with the discharge opening 15 and large enough to permit the movement of the receiving means 17 as well as the downward movement of the workpieces along the inclined surface 15b to the exterior of the housing 1, as is particularly apparent from FIG. 3.

It will be understood that each of the elements described above, or two or more together, may also find a useful application in other types of material handling apparatus differing from the types described above.

While the invention has been illustrated and described as embodied in material for handling small articles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a material handling apparatus, in combination, a stationary ring and a rotary ring located beside each other, having a common horizontal axis, and forming at least part of a container for workpieces, said stationary ring having an inner surface provided with a profile mating with that of the workpieces so that the latter will automatically become properly oriented with respect to the inner surface of said stationary ring, said rotary ring having a projection overlapping said stationary ring and turning along the inner surface thereof to engage a workpiece and move the latter along the inner surface of said stationary ring, the latter being formed at an elevation substantially higher than its lowest part with a discharge opening to which a workpiece is raised by said projection of said rotary ring; and turnable receiving means extending into said discharge opening to receive a workpiece from said projection of said rotary ring, the rotary ring acting through said projection and the workpiece on the turnable receiving means to turn the latter together with the workpiece received thereby to a position where the workpiece is no longer located in the path of turning movement of the projection of said rotary ring.

2. In a material handling apparatus, in combination, a stationary ring and a rotary ring located beside each other, having a common horizontal axis, and forming at least part of a container for workpieces, said stationary ring having an inner surface provided with a profile mating with that of the workpieces so that the latter will automatically become properly oriented with respect to the inner surface of said stationary ring, said rotary ring having a projection overlapping said stationary ring and turning along the inner surface thereof to engage a workpiece and move the latter along the inner surface of said stationary ring, the latter being formed at an elevation substantially higher than its lowest part with a discharge opening to which a workpiece is raised by said projection of said rotary ring; and turnable receiving means extending into said discharge opening to receive a workpiece from said projection of said rotary ring, the rotary ring acting through said projection and the workpiece on the turnable receiving means to turn the latter together with the workpiece received thereby to a position where the workpiece is no longer located in the path of turning movement of the projection of said rotary ring; and means cooperating with said turnable receiving means for automatically turning the latter beyond the position to which it is turned by the projection of the rotary ring acting through the workpiece on said receiving means.

3. In a material handling apparatus, in combination, a stationary ring and a rotary ring located beside each other, having a common horizontal axis, and forming at least part of a container for workpieces, said stationary ring having an inner surface provided with a profile mating with that of the workpieces so that the latter will automatically become properly oriented with respect to the inner surface of said stationary ring, said rotary ring having a projection overlapping said stationary ring and turning along the inner surface thereof to engage a workpiece and move the latter along the inner surface of said stationary ring, the latter being formed at an elevation substantially higher than its lowest part with a discharge opening to which a workpiece is raised by said projection of said rotary ring; and turnable receiving means extending into said discharge opening to receive a workpiece from said projection of said rotary ring, the rotary ring acting through said projection and the workpiece on the turnable receiving means to turn the latter together with the workpiece received thereby to a position where the workpiece is no longer located in the path of turning movement of the projection of said rotary ring, said projection having in engagement with the workpiece a surface inclined rearwardly with respect to the direction of the rotary ring.

4. In a material handling apparatus, in combination, a stationary ring and a coaxial rotary ring located beside and turnable with respect to said stationary ring, said rings having a common horizontal axis and forming at least part of a container for workpieces, said stationary ring having an inner surface provided with a profile corresponding to that of the workpiece so that the latter will become oriented properly with respect to the inner surface of said stationary ring and the latter being formed at an elevation substantially higher than its lowest elevation with a discharge opening through which the workpieces are adapted to move, said rotary ring having a projection overlapping said stationary ring and closely adjacent to said inner surface thereof and engaging a workpiece to move the latter along said inner surface of said stationary ring to said discharge opening thereof; turnable receiving means having an initial position extending into said discharge opening to receive a workpiece, said projection of said rotary ring acting through the workpiece on the turnable receiving means to turn the latter together with the workpiece received thereby to a position where the workpiece is no longer located in the path of turning of said projection of said rotary ring; an annular member extending coaxially around the turning axis of said receiving means and having an inclined surface portion; and a spring pressed plunger engaging said inclined surface portion when said receiving means has been turned to said position by the projection of said rotary ring acting through the workpiece on said receiving means, said plunger cooperating with said inclined surface to turn said receiving means beyond said position.

5. In a material handling apparatus, in combination, a stationary ring and a rotary ring having a common horizontal axis and located beside each other, said rings forming part of a container for workpieces and said stationary ring having an inner surface provided with a profile mating with that of workpieces so that the latter become automatically oriented with respect to the inner surface of said stationary ring, said rotary ring having a projection overlapping and located closely adjacent to the inner surface of said stationary ring for moving workpieces along the inner surface of the stationary ring, the latter being formed at an elevation substantially higher than its lowest part with a discharge opening for the workpieces, said projection raising the workpieces to said discharge opening, and said discharge opening having a lower edge, said stationary ring being formed in a plane normal to its axis with a narrow slot extending downwardly from said lower edge of said discharge opening; and turnable receiving means having an initial position located in said discharge opening to receive a workpiece from said projection, said turnable receiving means having a relatively thin portion extending into the discharge opening to receive the workpiece and said thin portion being thin enough to move through said slot to said initial position of said receiving means.

References Cited in the file of this patent

UNITED STATES PATENTS

| | | |
|---|---|---|
| 229,459 | Platt et al. | June 29, 1880 |
| 2,267,872 | Peterson | Dec. 30, 1941 |
| 2,661,866 | Lubbert et al. | Dec. 8, 1953 |